United States Patent
Galvan et al.

(10) Patent No.: US 12,344,732 B2
(45) Date of Patent: Jul. 1, 2025

(54) SCRATCH RESISTANT POLYOLEFIN COMPOSITION

(71) Applicant: BASELL POLIOLEFINE ITALIA S.R.L., Milan (IT)

(72) Inventors: Monica Galvan, Ferrara (IT); Michele Grazzi, Ferrara (IT); Claudio Cavalieri, Ferrara (IT); Mikhail Sergeevich Dureev, Butzbach (DE)

(73) Assignee: Basell Poliolefine Italia S.r.l., Milan (IT)

( * ) Notice: Subject to any disclaimer, the term of this patent is extended or adjusted under 35 U.S.C. 154(b) by 670 days.

(21) Appl. No.: 17/641,226

(22) PCT Filed: Aug. 28, 2020

(86) PCT No.: PCT/EP2020/074047
§ 371 (c)(1),
(2) Date: Mar. 8, 2022

(87) PCT Pub. No.: WO2021/047920
PCT Pub. Date: Mar. 18, 2021

(65) Prior Publication Data
US 2022/0348751 A1    Nov. 3, 2022

(30) Foreign Application Priority Data

Sep. 12, 2019  (EP) ..................... 19196862

(51) Int. Cl.
*C08L 23/14*  (2006.01)
*C08F 10/06*  (2006.01)
*C08L 23/12*  (2006.01)

(52) U.S. Cl.
CPC ............. *C08L 23/14* (2013.01); *C08F 10/06* (2013.01); *C08L 23/12* (2013.01); *C08L 23/142* (2013.01); *C08L 2205/025* (2013.01); *C08L 2205/035* (2013.01); *C08L 2314/02* (2013.01)

(58) Field of Classification Search
CPC ........ C08L 23/14; C08L 23/142; C08L 23/12; C08L 2205/035; C08L 2314/02; C08F 210/06; C08F 2500/35; C08F 2/001; C08F 4/6143; C08F 4/6145
See application file for complete search history.

(56) References Cited

U.S. PATENT DOCUMENTS

| | | | |
|---|---|---|---|
| 4,399,054 A | 8/1983 | Ferraris et al. | |
| 10,767,036 B2 * | 9/2020 | Galvan | C08L 23/12 |
| 10,882,287 B2 * | 1/2021 | Perdomi | B32B 27/32 |
| 11,174,379 B2 * | 11/2021 | De Palo | C08L 23/0815 |
| 11,929,192 B2 * | 3/2024 | Flenniken | C08L 23/14 |
| 11,976,198 B2 * | 5/2024 | Baudier | C08F 210/06 |
| 11,981,799 B2 * | 5/2024 | Cavalieri | C08L 23/12 |
| 11,981,803 B2 * | 5/2024 | Galvan | C08L 23/16 |
| 12,012,505 B2 * | 6/2024 | Galvan | C08L 23/06 |
| 12,024,623 B2 * | 7/2024 | Cavalieri | C08L 23/0815 |
| 2018/0179371 A1 * | 6/2018 | Cavalieri | C08L 23/12 |

FOREIGN PATENT DOCUMENTS

| | | | |
|---|---|---|---|
| EP | 0045977 A2 | 2/1982 | |
| EP | 0361493 A1 | 4/1990 | |
| EP | 0728769 A1 | 8/1996 | |
| WO | 2016207236 A1 | 12/2016 | |
| WO | WO-2016207235 A1 * | 12/2016 | ........... C08F 210/16 |
| WO | 2017202600 A1 | 11/2017 | |
| WO | 2019007684 A1 | 1/2019 | |
| WO | WO-2019091885 A1 * | 5/2019 | ........... C08L 23/06 |
| WO | WO-2019149549 A1 * | 8/2019 | ........... C08K 5/14 |
| WO | WO-2020148106 A1 * | 7/2020 | ........... C08L 23/06 |
| WO | WO-2020182435 A1 * | 9/2020 | ........... C08L 23/0815 |

OTHER PUBLICATIONS

Chunpeng Chai et al. edited, Polymer Synthetic Material Science, p. 24, Beijing Institute of Technology Press, 2019.
Songfen Gu edited, F. C. Campbell, Structural Composite Materials, p. 315, Shanghai Jiao Tong University Press, 2019.
International Search Report and Written Opinion Mailed Nov. 5, 2020 (Nov. 5, 2020) For Corresponding PCT/EP2020/074047.
Richard B. Lieberman et al.: "Polypropylene", Kirk-othermer Encyclopedia of Chemical Technology, Mar. 24, 2006 (Mar. 24, 2006), pp. 523-548, XP05007196, DOI: 10.1002/0471238961. 161512251209050 Retrieved from the Internet: URL: http://onlinelibrary.wiley.com/store/10.1002/0471238961.1615122512090502. a01.pub2/asset/polylieb.a01.pdf?v=1&t=gslfp3so&s+9b991b57bfd937110df3b20419539a4cb119a1d5 {retrieved on Sep. 15, 2011] Uses; p. 547.

* cited by examiner

*Primary Examiner* — Rip A Lee

(57) ABSTRACT

An injection molded article made from or containing a propylene-based composition made from or containing:
T1) from 90 wt % to 50 wt % of a propylene homopolymer; and
T2) from 10 wt % to 50 wt % of a polymer composition made from or containing
A) 5-35% by weight of a propylene homopolymer or a propylene ethylene copolymer;
B) 20-50% by weight of a copolymer of ethylene and a $C_3$-$C_8$ alpha-olefin containing from 0.1% to 20% by weight of alpha-olefin units; and
C) 30-60% by weight of a copolymer of ethylene and propylene containing from 25% to 75% by weight of ethylene units.

14 Claims, No Drawings

SCRATCH RESISTANT POLYOLEFIN COMPOSITION

This application is the U.S. National Phase of PCT International Application PCT/EP2020/074047, filed Aug. 28, 2020, claiming benefit of priority to European Patent Application No. 19196862.7, filed Sep. 12, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to polyolefin compositions and articles made therefrom.

BACKGROUND OF THE INVENTION

In some instances, a polyolefin composition made from or containing an amorphous olefin copolymer is added in polyolefin compositions to enhance the impact resistance for certain applications. In some instances, the applications are automotive applications.

SUMMARY OF THE INVENTION

In a general embodiment, the present disclosure provides an injection molded article made from or containing a propylene-based composition made from or containing:

T1) from 90 wt % to 50 wt %, based on the total weight of the propylene-based composition, of a propylene homopolymer having a fraction soluble in xylene at 25° C. lower than 6 wt % and having a melt flow rate (measured according to ISO 1133-1 2011 230° C./2.16 kg) between 1.0 to 80.0 g/10 min; and T2) from 10 wt % to 50 wt %, based on the total weight of the propylene-based composition, of a polymer composition made from or containing:

A) 5-35% by weight, based on the total weight of component T2, of a propylene homopolymer or a propylene ethylene copolymer containing 90% by weight or more of propylene units; wherein component A) containing 10% by weight or less of a fraction soluble in xylene at 25° C. ($XS_A$), both the amount of propylene units and of the fraction $XS_A$ being referred to the weight of A);

B) 20-50% by weight, based on the total weight of component T2, of a copolymer of ethylene and a $C_3$-$C_8$ alpha-olefin containing from 0.1% to 20% by weight of alpha-olefin units and containing 25% by weight or less of a fraction soluble in xylene at 25° C. ($XS_B$), both the amount of alpha-olefin units and of the fraction $XS_B$ being referred to the weight of (B); and C) 30-60% by weight, based on the total weight of component T2, of a copolymer of ethylene and propylene containing from 25% to 75% by weight of ethylene units and containing from 40% to 95% by weight of a fraction soluble in xylene at 25° C. ($XS_C$), both the amount of ethylene units and of the fraction $XS_C$ being referred to the weight of (C);

the amounts of (A), (B) and (C) being referred to the total weight of (A)+(B)+(C), and the sum of the amount of (A)+(B)+(C) is 100 wt %, based on the total weight of component T2; and the sum of the amounts of components T1 and T2 is 100 wt %, based on the total weight of the propylene-based composition.

DETAILED DESCRIPTION OF THE INVENTION

In some embodiments, the present disclosure provides an injection molded article made from or containing a propylene-based composition made from or containing:

T1) from 90 wt % to 50 wt %; alternatively from 85 wt % to 60 wt %, alternatively from 80 wt % to 70 wt %, based on the total weight of the propylene-based composition, of a propylene homopolymer having the fraction soluble in xylene at 25° C. lower than 6.0 wt %, alternatively lower than 5.0 wt %, and having a melt flow rate (measured according to ISO 1133-1 2011 230° C./2.16 kg) between 1.0 to 80.0 g/10 min, alternatively between 1.5 to 60.0 g/10 min, alternatively between 1.8 to 30.0 g/10 min; and T2) from 10 wt % to 50 wt %; alternatively from 15 wt % to 40 wt %; alternatively from 20 wt % to 30 wt %, based on the total weight of the propylene-based composition, of a polymer composition made from or containing:

A) 5-35% by weight; alternatively 10-30% by weight; alternatively 15-23% by weight, based on the total weight of component T2, of a propylene homopolymer or a propylene ethylene copolymer containing 90% by weight or more, alternatively 95% by weight or more; alternatively 97% by weight or more, of propylene units; wherein component A) containing 10% by weight or less, alternatively 8 wt % or less, alternatively 6 wt % or less, of a fraction soluble in xylene at 25° C. ($XS_A$), both the amount of propylene units and of the fraction $XS_A$ being referred to the weight of A);

B) 20-50% by weight; alternatively 25-45% by weight; alternatively 30-40% by weight, based on the total weight of component T2, of a copolymer of ethylene and a $C_3$-$C_8$ alpha-olefin containing from 0.1% to 20% by weight; alternatively from 5% to 15% by weight; alternatively from 7% to 12% by weight, of alpha-olefin units and containing 25% by weight or less; alternatively from 20% by weight or less; alternatively 17% by weight or less, of a fraction soluble in xylene at 25° C. ($XS_B$), both the amount of alpha-olefin units and of the fraction $XS_B$ being referred to the weight of (B); and C) 30-60% by weight; alternatively 35-55% by weight; alternatively 40-50% by weight, based on the total weight of component T2, of a copolymer of ethylene and propylene containing from 25% to 75% by weight; alternatively from 37% to 65% by weight; alternatively from 45% to 58% by weight, of ethylene units and containing from 40% to 95% by weight of a fraction soluble in xylene at 25° C. ($XS_C$), both the amount of ethylene units and of the fraction $XS_C$ being referred to the weight of (C);

the amounts of (A), (B) and (C) being referred to the total weight of (A)+(B)+(C), the sum of the amount of (A)+(B)+(C) being 100 wt %, based on the total weight of component T2; the sum of the amounts of components T1) and T2) being 100 wt %, based on the total weight of the propylene-based composition.

In some embodiments, component (A) has a melt flow rate (measured according to ISO 1133-1 2011 230° C./2.16 kg) between 50 and 200 g/10 min; alternatively between 80 and 170 g/10 min.

In some embodiments, components (A)+(B) blended together have a melt flow rate (measured according to ISO 1133-1 2011 230° C./2.16 kg) between 0.1 and 70 g/10 min.; alternatively between 1 and 50 g/10 min; alternatively between 8 and 40 g/10 min.

In some embodiments, component B) has a density (determined according to ISO 1183 2004 at 23° C.) of from 0.940 to 0.965 $g/cm^3$. Component B) is an ethylene copolymer containing $C_3$-$C_8$ alpha-olefin derived units. In some embodiments, the alpha-olefin comonomers are selected from the group consisting of propylene, 1-butene, 1-pentene, 4-methyl-1-pentene, 1-hexene and 1-octene. In some embodiments, the alpha-olefin comonomers are selected from the group consisting of 1-butene, 1-hexene, and 1-octene. In some embodiments, the alpha-olefin comonomer is 1-butene.

In some embodiments, the polyolefin composition has a melt flow rate (measured according to ISO 1133-1 2011 230° C./2.16 kg) between 0.5 to 25 g/10 min, alternatively from 0.8 to 20.0 g/10 min; alternatively from 1.0 to 18.0 g/10 min.

In some embodiments, the xylene soluble fraction at 25° C. of the polyolefin composition has an intrinsic viscosity [η] (measured in tetrahydronaphthalene at 135° C.) between 1.5 to 4.0 dl/g, alternatively between 2.0 and 3.5 dl/g; alternatively between 2.1 and 2.8 dl/g.

As used herein, the term "copolymer" refers to polymers containing two kinds of comonomers, such as propylene and ethylene or ethylene and 1-butene.

In some embodiments, the polyolefin composition is used to produce molded articles, alternatively injection molded articles. In some embodiments, the injection molded articles are automotive interior parts. In some embodiments, the polypropylene composition has a scratch resistance, measured according to GME 20280 procedure A, lower than 0.8 dl; alternatively lower than 0.52 dl; alternatively equal to or higher than 0.0 dl.

In some embodiments, the polyolefin composition T2) is prepared by a sequential polymerization, including at least three sequential steps, wherein components (A), (B) and (C) are prepared in separate subsequent steps, operating in each step, except the first step, in the presence of the polymer formed and the catalyst used in the preceding step. In some embodiments, the catalyst is added in the first step and not in subsequent steps. In some embodiments, the catalyst remains active for the subsequent steps.

In some embodiments, the polymerization is a continuous process. In some embodiments, the polymerization is a batch process. In some embodiments, the polymerization is carried out in liquid phase, in the presence of not of inert diluent, or in gas phase, or by mixed liquid-gas techniques. In some embodiments, the polymerization is carried out in gas phase.

In some embodiments, the temperature for the polymerization is from 50 to 100° C. In some embodiments, the pressure for the polymerization steps is atmospheric or higher.

In some embodiments, the molecular weight is regulated. In some embodiments, the molecular weight regulator is hydrogen.

In some embodiments, the polymerizations are carried out in the presence of a Ziegler-Natta catalyst. In some embodiments, a Ziegler-Natta catalyst is made from or containing the product of the reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on $MgCl_2$.

In some embodiments, the catalysts are made from or containing the product of the reaction of the organometallic compound of group 1, 2 or 13 of the Periodic Table of elements, with a solid catalyst component made from or containing a Ti compound and an electron donor compound supported on $MgCl_2$.

In some embodiments, the organometallic compounds are aluminum alkyl compounds.

In some embodiments, the polymer composition B) is obtained by using a Ziegler-Natta polymerization catalyst, alternatively a Ziegler-Natta catalyst supported on $MgCl_2$, alternatively a Ziegler-Natta catalyst made from or containing the product of reaction of:

1) a solid catalyst component made from or containing a Ti compound and an electron donor (internal electron-donor) supported on $MgCl_2$;
2) an aluminum alkyl compound (cocatalyst); and, optionally,
3) an electron-donor compound (external electron-donor).

In some embodiments, the solid catalyst component (1) contains as electron-donor a compound selected from the group consisting of ethers, ketones, lactones, compounds containing N, P and/or S atoms, and mono- and dicarboxylic acid esters.

In some embodiments, the catalysts are as described in U.S. Pat. No. 4,399,054 and European Patent No. 45977.

In some embodiments, the electron-donor compounds are selected from the group consisting of phthalic acid esters and succinic acid esters. In some embodiments, the phthalic acid ester is diisobutyl phthalate.

In some embodiments, the succinic acid esters are represented by the formula (I):

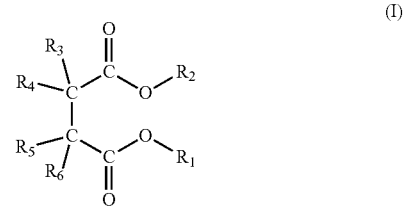

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, are hydrogen or a $C_1$-$C_{20}$ linear or branched alkyl, alkenyl, cycloalkyl, aryl, arylalkyl or alkylaryl group, optionally containing heteroatoms. In some embodiments, the radicals $R_3$ to $R_6$ are joined to the same carbon atom and linked together to form a cycle.

In some embodiments, $R_1$ and $R_2$ are selected from the group consisting of $C_1$-$C_8$ alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl or alkylaryl radical having from 3 to 10 carbon atoms. In some embodiments, at least two radicals from $R_3$ to $R_6$ are different from hydrogen and selected from $C_1$-$C_{20}$ linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, $R_3$ and $R_5$ are different from hydrogen and linked to different carbon atoms. In some embodiments, $R_4$ and $R_6$ are different from hydrogen and linked to different carbon atoms.

In some embodiments, the electron-donors are the 1,3-diethers described in European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine.

In some embodiments, the silicon compounds have the formula $R^1_a R^2_b Si(OR^3)_c$, where a and b are integer numbers from 0 to 2, c is an integer from 1 to 3 and the sum (a+b+c) is 4; $R^1$, $R^2$ and $R^3$ are alkyl, cycloalkyl or aryl radicals with 1-18 carbon atoms optionally containing heteroatoms.

In some embodiments, the silicon compounds are selected from the group consisting of (tert-butyl)$_2$Si(OCH$_3$)$_2$, (cyclohexyl)(methyl)Si (OCH$_3$)$_2$, (phenyl)$_2$Si(OCH$_3$)$_2$ and (cyclopentyl)$_2$Si(OCH$_3$)$_2$.

In some embodiments, the 1,3-diethers are used as external donors. In some embodiments, the internal donor is a 1,3-diether and the external donor is omitted.

In some embodiments, the catalysts are pre-contacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the operation takes place in liquid monomer, producing a quantity of polymer up to 1000 times the weight of the catalyst.

In some embodiments, the propylene-based composition is used to produce injection molded articles, alternatively injection molded articles for interior automotive. In some embodiments, the present disclosure provides an injection molded article made from or containing the propylene-based composition. In some embodiments, the injection molded article is an interior automotive injection molded article.

The following examples are given to illustrate, but not limit the present disclosure.

EXAMPLES

Characterizations

Xylene-Soluble Faction at 25° C. (XS or Xs)

Solubility in xylene: Determined as follows.

2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirring for further 30 minutes. The closed flask was then kept for 30 minutes in a bath of ice and water and then in a thermostatic water bath at 25° C. for 30 minutes. The resulting solid was filtered on quick filtering paper. 100 ml of the filtered liquid were poured in a pre-weighed aluminum container, which was heated on a heating plate under nitrogen flow, thereby removing the solvent by evaporation. The container was then kept in an oven at 80° C. under vacuum until a constant weight was obtained. The weight percentage of polymer soluble in xylene at room temperature was then calculated.

The content of the xylene-soluble fraction is expressed as a percentage of the original 2.5 grams and then, by difference (complementary to 100), the xylene insoluble %.

XS of components B) and C) were calculated by using the formula:

$$XS_{tot} = WaXS_A + WbXS_B + WcXS_C$$

wherein Wa, Wb and Wc were the relative amount of components A, B and C (Wa+Wb+Wc=1).

Melt Flow Rate (MFR)

Measured according to ISO 1133-1 2011 at 230° C. with a load of 2.16 kg, unless otherwise specified.

Intrinsic Viscosity (IV)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Comonomer ($C_2$ and $C_4$) Content

Comonomer ($C_2$ and $C_4$) Content

The content of comonomers was determined by infrared spectroscopy by collecting the IR spectrum of the sample vs. an air background with a Fourier Transform Infrared spectrometer (FTIR). The instrument data acquisition parameters were:

purge time: 30 seconds minimum
collect time: 3 minutes minimum
apodization: Happ-Genzel
resolution: 2 cm$^{-1}$.

Sample Preparation—Using a hydraulic press, a thick sheet was obtained by compression molding about 1 g of sample between two aluminum foil sheets. A small portion was cut from the resulting sheet to mold a film. The film thickness was set to have a maximum absorbance of the CH$_2$ absorption band recorded at ~720 cm$^{-1}$ of 1.3 a.u. (% Transmittance>5%). Molding conditions were 180±10° C. (356° F.) with pressure around 10 kg/cm$^2$ (142.2 PSI) for about one minute. The pressure was then released. The sample was removed from the press and cooled to room temperature. The spectrum of pressed film sample was recorded in absorbance vs. wavenumbers (cm$^{-1}$). The following measurements were used to calculate ethylene ($C_2$) and 1-butene ($C_4$) contents:

a) Area ($A_t$) of the combination absorption bands between 4482 and 3950 cm$^{-1}$ which was used for spectrometric normalization of film thickness.
b) Area ($A_{C2}$) of the absorption band due to methylenic sequences (CH$_2$ rocking vibration) in a range of 660 to 790 cm$^{-1}$ after a proper digital subtraction of an isotactic polypropylene (IPP) and a C$_2$C$_4$ references spectrum.
c) The factor of subtraction (FCR$_{C4}$) between the spectrum of the polymer sample and the C$_2$C$_4$ reference spectrum: The reference spectrum was obtained by digital subtraction of a linear polyethylene from a C$_2$C$_4$ copolymer to extract the C$_4$ band (ethyl group at ~771 cm-1).

The ratio $A_{C2}/A_t$ was calibrated by analyzing ethylene-propylene standard copolymers of compositions as determined by NMR spectroscopy.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150).

To calculate the ethylene (C$_2$) and 1-butene (C$_4$) content, calibration curves were obtained by using reference samples of ethylene and 1-butene, detected by $^{13}$C-NMR.

Calibration for ethylene—A calibration curve was obtained by plotting $A_{C2}/A_t$ versus ethylene molar percent (% C2m). The coefficients $a_{C2}$, $b_{C2}$ and $c_{C2}$ were calculated from a "linear regression".

Calibration for 1-butene—A calibration curve was obtained by plotting FCR$_{C4}/A_t$ versus butane molar percent (% C$_4$m). The coefficients $a_{C4}$, $b_{C4}$ and $C_{C4}$ were calculated from a "linear regression".

The spectra of the samples were recorded and then ($A_t$), ($A_{C2}$) and (FCR$_{C4}$) were calculated.

The ethylene content (% molar fraction C2m) of the sample was calculated as follows:

$$\% \; C2m = -b_{C2} + \frac{\sqrt{b_{C2}^2 - 4 \cdot a_{C2} \cdot \left(c_{C2} - \frac{A_{C2}}{A_t}\right)}}{2 \cdot a_{C2}}$$

The 1-butene content (% molar fraction C4m) of the sample was calculated as follows:

$$\% \; C4m = -b_{C4} + \frac{\sqrt{b_{C4}^2 - 4 \cdot a_{C4} \cdot \left(c_{C4} - \frac{FCR_{C4}}{A_t}\right)}}{2 \cdot a_{C4}}$$

$a_{C4}$, $b_{C4}$, $c_{C4}$, $a_{C2}$, $b_{C2}$, and $c_{C2}$ were the coefficients of the two calibrations.

Changes from mol % to wt % were calculated by using molecular weights.

Amount (wt %) of comonomer of components A-C were calculated by using the relationship:

$$Com_{tot} = WaCom_A + WbCom_B + WcCom_C$$

wherein Wa, Wb and We were the relative amount of components A, B and C (A+B+C=1)

Comtot, ComA, ComB, ComC were the amounts of comonomer in the composition (tot) and components A-C.

Scratch Resistance

Scratch resistance was measured according to GME 60208 procedure A.

Charpy Impact Test

Charpy impact test was performed according to ISO 179-1eA 2010, e ISO 1873-2 2007.

Examples 1—Preparation of Polyolefin Composition T2

Catalyst Precursor

The solid catalyst component used in polymerization was a Ziegler-Natta catalyst component supported on magnesium chloride, containing titanium and diisobutylphthalate as internal donor. An initial amount of microspheroidal MgCl$_2 \cdot$2.8C$_2$H$_5$OH was prepared according to the method described in Example 2 of U.S. Pat. No. 4,399,054 but operating at 3,000 rpm instead of 10,000. The resulting adduct was then subject to thermal dealcoholation at increasing temperatures from 30 to 130° C., operating in nitrogen current, until the molar alcohol content per mol of Mg is 1.16. Into a 1000 mL four-necked round flask, purged with nitrogen, 500 mL of TiCl$_4$ were introduced at 0° C. While stirring, 30 grams of the microspheroidal MgCl$_2 \cdot$1.16C$_2$H$_5$OH adduct were added. The temperature was raised to 120° C. and maintained for 60 minutes. During the temperature increase, an amount of diisobutylphthalate was added to produce a Mg/diisobutylphthalate molar ratio of 18. After the 60 minutes, the stirring was stopped, the liquid siphoned was off, and the treatment with TiCl$_4$ was repeated at 100° C. for 1 hour in the presence of an amount of diisobutylphthalate to produce a Mg/diisobutylphthalate molar ratio of 27. After that time, the stirring was stopped, the liquid was siphoned off, and the treatment with TiCl$_4$ was repeated at 100° C. for 30 min. After sedimentation and siphoning at 85° C. the solid was washed six times with anhydrous hexane (6×100 ml) at 60° C.

Catalyst System and Prepolymerization

Before introducing the solid catalyst component into the polymerization reactors, the solid catalyst component was contacted at 30° C. for 9 minutes with aluminum triethyl (TEAL) and dicyclopentyldimethoxysilane (DCPMS), in a TEAL/DCPMS weight ratio equal to about 15 and in such quantity that the TEAL/solid catalyst component weight ratio was equal to 4.

The catalyst system was then subjected to prepolymerization by suspending the catalyst system in liquid propylene at 50° C. for about 75 minutes before introducing the catalyst system into the first polymerization reactor.

Polymerization

The polymerization is carried out in continuous in a series of three gas-phase reactors equipped with devices to transfer the product from the first reactor to the second reactor. Into the first gas phase polymerization reactor, a propylene-based polymer (A) was produced by feeding the prepolymerized catalyst system, hydrogen (used as molecular weight regulator) and propylene, with the components in a gas state, in a continuous and constant flow. The propylene-based polymer (A) coming from the first reactor was discharged in a continuous flow and, after having been purged of unreacted monomers, introduced, in a continuous flow, into the second gas phase reactor, together with quantitatively constant flows of hydrogen and ethylene, with the components in a gas state. In the second reactor, a copolymer of ethylene (B) was produced. The product coming from the second reactor was discharged in a continuous flow and, after having been purged of unreacted monomers, introduced, in a continuous flow, into the third gas phase reactor, together with quantitatively constant flows of hydrogen, ethylene and propylene, with the components in a gas state. In the third reactor, an ethylene-propylene polymer (C) was produced. Polymerization conditions, molar ratio of the reactants and composition of the resulting copolymers are shown in Table 1. The polymer particles exiting the third reactor were subjected to a steam treatment to remove the reactive monomers and volatile substances, and then dried. Thereafter the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made from or containing:

0.1% by weight of Irganox® 1010;
0.1% by weight of Irgafos® 168; and
0.04% by weight of DHT-4A (hydrotalcite);

where the percent amounts refer to the total weight of the polymer and stabilizing additive composition.

The Irganox® 1010 was 2,2-bis[3-[5-bis(1,1-dimethylethyl)-4-hydroxyphenyl)-1-oxopropoxy]methyl]-1,3-propanediyl-3,5-bis(1,1-dimethylethyl)-4-hydroxybenzenepropanoate, while Irgafos® 168 was tris(2,4-di-tert.-butylphenyl)phosphite. The characteristics relating to the polymer composition, reported in Table 2, were obtained from measurements carried out on the extruded polymer, which constituted a stabilized ethylene polymer composition.

TABLE 1

| Polymerization conditions | | |
|---|---|---|
| Example | | 1 |
| 1st Reactor - component (A) | | |
| Temperature | ° C. | 60 |
| Pressure | barg | 16 |
| $H_2/C_{3-}$ | mol. | 0.24 |
| Split | wt % | 22 |
| Xylene soluble of (A) ($XS_A$) | wt % | 4.2 |
| MFR of (A) | g/10 min. | 110 |
| 2nd Reactor - component (B) | | |
| Temperature | ° C. | 80 |
| Pressure | barg | 18 |
| $H_2/C_{2-}$ | mol. | 0.81 |
| $C_{4-}/(C_{2-} + C_{4-})$ | mol. | 0.25 |
| $C_{2-}/(C_{2-} + C_{3-})$ | mol. | 0.98 |
| Split | wt % | 32 |
| $C_{2-}$ content of B * | wt % | 90 |
| $C_{4-}$ content of B * | wt % | 10 |
| Xylene soluble of B ($XS_B$) * | wt % | 16.0 |
| Xylene soluble of (A + B) | wt % | 12.0 |
| MFR of (A + B) | g/10 min. | 35.9 |
| 3rd Reactor - component (C) | | |
| Temperature | ° C. | 65 |
| Pressure | barg | 18 |

TABLE 1-continued

| Polymerization conditions | | |
|---|---|---|
| Example | | 1 |
| $H_2/C_{2-}$ | mol. | 0.17 |
| $C_{2-}/(C_{2-} + C_{3-})$ | mol. | 0.42 |
| Split | wt % | 46 |
| $C_{2-}$ content of C * | wt % | 52 |
| Xylene soluble of (C) ($XS_C$)* | wt % | 83 |

Notes:
$C_{2-}$ = ethylene (IR);
$C_{3-}$ = propylene (IR);
$C_{4-}$ = 1-butene (IR);
split = amount of polymer produced in the concerned reactor.
* Calculated values.

The features of the polymer of Example 1 are reported on Table 2.

TABLE 2

| Example | | 1 |
|---|---|---|
| component A | | |
| $C_2$ content | wt % | 0 |
| XSA | wt % | 4.2 |
| MFR | g/10 min | 110 |
| split | wt % | 22 |
| component B | | |
| XSB* | wt % | 16 |
| $C_2$ content* | wt % | 90.0 |
| $C_4$ content* | wt % | 10.0 |
| split | wt % | 32 |
| MFR of (A + B) | g/10 min | 35.9 |
| Component C | | |
| XSC* | wt % | 83 |
| $C_2$ content* | wt % | 52 |
| split | wt % | 46 |
| total composition | | |
| MFR | g/10 min | 1.61 |
| IV on soluble in Xylene | dl/g | 2.4 |

$C_2$ ethylene;
$C_4$ 1-butene;
* calculated

Component T1

Commercially available propylene homopolymers having different MFR as reported in Table 3 were used.

TABLE 3

| T1 | MFR g/10 min | Xylene solubles at 25° C. wt % |
|---|---|---|
| A | 2 | 2 |
| B | 25 | 2.3 |
| C | 50 | 2.5 |

Examples 1-3

Blends of components T1 with component T2 were obtained according to Table 4. The features of the resulting compositions are reported in Table 6.

TABLE 4

| Ex | T1 (MFR) | T2 wt %* |
|---|---|---|
| 1 | 25 | 25 |
| 2 | 50 | 25 |
| 3 | 2 | 25 |

*the remaining amount being T1

Comparative Examples 4-6

In comparative examples 4-6, catalloy CA 7320 heterophasic copolymer (commercially-available from LyondellBasell) and catalloy CA138A heterophasic copolymer (commercially available from LyondellBasell) were used to obtain the compositions of Table 4, instead of component T2. The features of the compositions are reported in Table 6.

TABLE 5

| Comp Ex. | T1 (MFR) | CA 7320 wt %* | CA138A wt %* |
|---|---|---|---|
| 4 | 25 | — | 25 |
| 5 | 50 | 25 | |
| 6 | 2 | 25 | |
| 7 | 2 | | 25 |

*the remaining amount being T1

| Ex | Charpy 23° C. KJ/m$^2$ | Charpy 0° C. KJ/m$^2$ | Charpy −20° C. KJ/m$^2$ | Scratch res (10N) N127 | Scratch res (10N) N111 |
|---|---|---|---|---|---|
| 1 | 5.9 | 3.7 | 3.1 | 0.1 | 0.4 |
| C4 | 6.1 | 3.7 | 2.7 | 2.0 | 1.2 |
| 2 | 5.5 | 3.7 | 3.1 | 0.5 | 0.7 |
| C5 | 8.3 | 5.7 | 3.9 | 1.6 | 1.0 |
| 3 | 71.8 | 4.0 | 2.2 | 0.0 | 0.0 |
| C6 | 48.0 | 7.9 | 5.0 | 0.2 | 0.2 |
| C7 | 18.2 | 6.6 | 5.4 | 1.1 | 0.8 |

What is claimed is:

1. An injection molded article comprising:
a propylene-based composition comprising:
T1) from 90 wt % to 70 wt % based on a total weight of the propylene-based composition, of a propylene homopolymer having a fraction soluble in xylene at 25° C. lower than 6 wt % and having a melt flow rate (measured according to ISO 1133-1 2011 230° C./2.16 kg) between 1.0 to 80.0 g/10 min; and
T2) from 10 wt % to 30 wt % based on the total weight of the propylene-based composition, of a polymer composition comprising:
   A) 5-35% by weight, based on a total weight of component T2, of a propylene homopolymer or a propylene ethylene copolymer containing 90% by weight or more of propylene units; wherein component A) containing 10% by weight or less of a fraction soluble in xylene at 25° C. (XS$_A$), both the amount of propylene units and of the fraction XS$_A$ being referred to the weight of A);
   B) 20-50% by weight; based on the total weight of component T2, of a copolymer of ethylene and a $C_3$-$C_8$ alpha-olefin containing from 0.1% to 20% by weight of $C_3$-$C_8$ alpha-olefin units and containing 25% by weight or less; of a fraction soluble in xylene at 25° C. (XS$_B$), both the amount of $C_3$-$C_8$ alpha-olefin units and of the fraction XS$_B$ being referred to the weight of (B); and
   C) 30-60% by weight, based on the total weight of component T2, of a copolymer of ethylene and propylene containing from 25% to 75% by weight of ethylene units and containing from 40% to 95% by weight of a fraction soluble in xylene at 25° C. (XS$_C$), both the amount of ethylene units and of the fraction XS$_C$ being referred to the weight of (C);
the amounts of (A), (B) and (C) being referred to the total weight of (A)+(B)+(C), the sum of the amount of (A)+(B)+(C) being 100 wt %, based on the total weight of component T2; and
the sum of the amounts of components T1 and T2 being 100 wt %, based on the total weight of the propylene-based composition.

2. The injection molded article according to claim 1, wherein, in the propylene-based composition,
Component A ranges from 10% by weight to 30% by weight;
Component B ranges from 25% by weight to 45% by weight; and
Component C ranges from 35% by weight to 55% by weight.

3. The injection molded article according to claim 1, wherein, in the propylene-based composition,
Component A ranges from 15% by weight to 23% by weight;
Component B ranges from 30% by weight to 40% by weight; and
Component C ranges from 40% by weight to 50% by weight.

4. The injection molded article according to claim 1, wherein, in the propylene-based composition, component A) is a polypropylene homopolymer.

5. The injection molded article according to claim 1, wherein, in the propylene-based composition, component B) is a copolymer of ethylene and a $C_3$-$C_8$ alpha-olefin containing from 5% to 15% by weight of $C_3$-$C_8$ alpha-olefin units.

6. The injection molded article according to claim 1, wherein, in the propylene-based composition, component C) is a copolymer of ethylene and propylene containing from 37% to 65% by weight of ethylene units.

7. The injection molded article according to claim 1, wherein, in the propylene-based composition, component (A) has a melt flow rate (230° C./2.16 kg) between 50 and 200 g/10 min.

8. The injection molded article according to claim 1, wherein, in the propylene-based composition, components (A)+(B) blended together have a melt flow rate (230° C./2.16 kg) between 0.1 and 70 g/10 min.

9. The injection molded article according to claim 1, wherein the polymer composition has a melt flow rate (230° C./2.16 kg) between 0.5 to 25 g/10 min.

10. The injection molded article according to claim 1, wherein, in the propylene-based composition, component T1 ranges from 85 wt % to 70 wt % and component T2 ranges from 15 wt % to 30 wt %.

11. The injection molded article according to claim 1, wherein, in the propylene-based composition, component T1 ranges from 80 wt % to 70 wt % and component T2 ranges from 20 wt % to 30 wt %.

12. The injection molded article according to claim 1, wherein, in the propylene-based composition and in component T1, the propylene homopolymer has the melt flow rate (measured according to ISO 1133-1 2011 230° C./2.16 kg) between 1.5 to 60.0 g/10 min.

13. The injection molded article according to claim 1, wherein, in the propylene-based composition and in component T1, the propylene homopolymer has the melt flow rate (measured according to ISO 1133-1 2011 230° C./2.16 kg) between 1.8 to 30.0 g/10 min.

14. The injection molded article according to claim 1, wherein the injection molded article is an interior automotive injection molded article.

* * * * *